United States Patent
Satapathy

(10) Patent No.: US 7,328,021 B1
(45) Date of Patent: Feb. 5, 2008

(54) METHOD AND SYSTEM FOR USING A MEASURE OF SPECTRAL INTERFERENCE TO DETERMINE WHETHER TO OUTPUT SIGNALS TO A WIRELESS LINK

(75) Inventor: Durga Satapathy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 494 days.

(21) Appl. No.: 10/255,792

(22) Filed: Sep. 26, 2002

(51) Int. Cl.
*H04Q 7/20* (2006.01)

(52) U.S. Cl. ............... 455/445; 455/67.11; 455/67.13; 455/452.2

(58) Field of Classification Search ................ 455/445, 455/417, 422.1, 426.2, 428, 423–424, 435.1–435.2, 455/436–439, 452.2, 456.5, 443–444, 509, 455/513, 67.13, 67.11, 524–525, 456, 461, 455/466, 442; 370/331–333, 335, 337
See application file for complete search history.

(56) References Cited

U.S. PATENT DOCUMENTS

| | | | |
|---|---|---|---|
| 5,862,208 A * | 1/1999 | MeLampy et al. | 379/212.01 |
| 6,584,316 B1 * | 6/2003 | Akhteruzzaman et al. | 455/445 |
| 6,591,103 B1 * | 7/2003 | Dunn et al. | 455/436 |
| 6,738,619 B1 * | 5/2004 | Yabuta et al. | 455/423 |
| 6,804,532 B1 * | 10/2004 | Moon et al. | 455/552.1 |
| 7,088,695 B1 * | 8/2006 | Moon et al. | 370/331 |

OTHER PUBLICATIONS

Sungmoon M. Shin, et al., "Interference-Based Channel Assignment for DS-CDMA Cellular Systems", *IEEE Transactions on Vehicular Technology*, vol. 48, No. 1, Jan. 1999, pp. 233-239, 7 pages.

"AccessPlanner—Backhaul Network Planning Tool", NetAdvantage, Inc., www.netadvantageinc.com/AccessPlanner.htm, printed May 22, 2002, 3 pages.

"Our Software Tools", Cox Associates, Inc., www.cox-associates.com/tools.htm, printed May 22, 2002, 5 pages.

"Lynx® Digital Microwave Radios: Understanding & Overcoming Radio Interference", Western Multiplex, 4 pages.

* cited by examiner

*Primary Examiner*—Pablo N. Tran

(57) ABSTRACT

A network entity, such as a base station, a mobile switching center, or a packet data serving node, may be communicatively coupled to at least two transmission paths, at least one of which is a wireless link. The network entity may receive signals from wireless terminals and output the signals to a first transmission path, i.e., a wireless link, or to a second transmission path, i.e., a wired link or another wireless link. The network entity may output the signals to the first transmission path or the second transmission path based on whether or not the measure of spectral interference for the wireless link meets predetermined criteria.

19 Claims, 4 Drawing Sheets

METHOD AND SYSTEM FOR USING A MEASURE OF SPECTRAL INTERFERENCE TO DETERMINE WHETHER TO OUTPUT SIGNALS TO A WIRELESS LINK

BACKGROUND

1. Field of the Invention

The present invention relates to wireless communications and, more particularly, to a method and system for using a measure of spectral interference to determine whether to output signals to a wireless link.

2. Description of Related Art

In a wireless network, a wireless terminal such as a cellular telephone or a computer with wireless modem is communicatively coupled to a radio access network. The radio access network enables the wireless terminal to communicate with a remote device, e.g., a telephone or another computer.

The radio access network has a base station. The base station consists of a base transceiver station (BTS) and a base station controller (BSC). The base station is communicatively coupled to a mobile switching center (MSC) and a packet data serving node (PSDN). The MSC and the PDSN provide connectivity to a public switched telephone network (PSTN) and Internet, respectively. As a result, the wireless terminal can communicate with the remote device.

The base station exchanges signals with the wireless terminal by way of an air interface. The base station receives signals from the MSC or the PDSN and transmits the signals to the wireless terminal over the air interface. Additionally, the base station receives signals from the wireless terminal over the air interface and outputs the signals to the MSC or the PDSN. One or more wireless links communicatively couple the BTS, the BSC, and the MSC or the BTS, BSC, and the PDSN. And one or more wired links communicatively couple the MSC to the PSTN and the PDSN to the Internet.

In an ideal environment, the wireless links reliably carry the signals between the base station and the MSC and the base station and the PDSN. In reality, however, other signals interfere with the signals carried by the wireless links. The other signals are from licensed and unlicensed devices that transmit within a range of frequencies defined for the wireless links. Additionally, the other signals are from multi-path reflections of the signals carried by the wireless links. The interference from the other signals is commonly referred to as spectral interference. Spectral interference introduces errors into the signals carried by the wireless links, thus reducing a reliability of the wireless links.

The spectral interference is characterized by a bit error rate (BER) or a signal to noise (S/N) ratio. The BER is a measure of a number of bits that are received through a wireless link in error during a period of time. On the other hand, the S/N is a measure of signal strength of signals received over the wireless link as compared to noise over the wireless link. The signals received over the wireless link may be those signals carried by the wireless link. And the noise may be background noise, licensed signals, and unlicensed signals that exist within the range of frequencies defined for the wireless link.

To minimize the spectral interference for the wireless link, a service provider typically performs a truck roll-out. The truck roll out involves the service provider going out to end points of the wireless link and, using a spectral analyzer, making one or more spectral interference measurements. The service provider then uses the spectral interference measurements to configure the wireless link so that the spectral interference for the wireless link is at a predefined level.

The service provider can configure the wireless link in many ways so that the spectral interference is at the predefined level. For instance, if an endpoint of the wireless link transmits signals over a first range of frequencies and receives signals over a second range of frequencies, then the service provider can reduce the spectral interference by reversing the range of frequencies at which the signals are transmitted and received. For example, the wireless link may be reconfigured to receive signals over the first range of frequencies and transmit signals over the second range of frequencies. As a result, the spectral interference in the second range of frequencies no longer poses a problem because the signals are now received over the first range of frequencies. Additionally or alternatively, the service provider may increase power of the signals that are transmitted so as to overcome the spectral interference. Still additionally or alternatively, the service provider may increase strength of a received signal by deploying a high-gain antenna. The high-gain antenna allows for increased strength of the received signal and transmission of more a focused signal, thereby overcoming the spectral interference.

SUMMARY

The present invention stems from a realization that the spectral interference for a wireless link is dynamic in nature. The spectral interference varies in accordance with whether at a given time there are interfering signals present within the range of frequencies that defines the wireless link. Therefore, performing a truck roll out is insufficient to ensure that the spectral interference remains at an acceptable level for long periods of time. There exists a need to account for the dynamic nature of the spectral interference when transmitting and receiving signals through the wireless link.

In accordance with a principle aspect of the present invention, a network entity may be communicatively coupled to at least two transmission paths, at least one of which is a wireless link. The network entity may receive signals from another entity, e.g., a wireless terminal, MSC, PDSN, and determine whether to output the signals to a first transmission path, i.e., the wireless link, or a second transmission path, e.g., a wired link or another wireless link. The network entity may output the signals to the first transmission path based on a determination that the measure of spectral interference meets predetermined criteria. Alternatively, the network entity may output the signals to a second transmission path based on the determination that the measure of spectral interference does not meet the predetermined criteria.

According to one exemplary embodiment of the present invention, the measure of spectral interference may be a bit error rate (BER). The BER may indicate a reliability of the wireless link to carry the signals. The BER may be measured by determining bits in error for a digital signal received by the network entity. For example, the digital signal received may be supposed to define a predetermined pattern of bits. The network entity may compare bits defined by the digital signal received to the predetermined pattern that the digital signal is supposed to define. The BER may be a number of bits that do not match the predetermined pattern as compared to a total number of bits in the predetermined pattern. Alternatively, the BER may be determined by comparing a cyclic redundancy check (CRC) code in the digital signal received with one calculated by the network entity. The BER may be a number of bits that differ between the CRC code in the digital signal received and the CRC code calculated by the network entity as compared to a total number of bits in the digital signal received.

According to another exemplary embodiment of the present invention, the measure of spectral interference may be a signal-to-noise ratio (S/N). The S/N may also indicate the reliability of the wireless link to carry the signals. The network entity may measure the S/N by determining signal strength of signals received at the network entity and noise for the wireless link. The network entity may calculate a ratio of the signal strength to the noise so as to characterize the S/N for the wireless link.

As noted, the network entity may compare the measure of spectral interference to the predetermined criteria to determine whether to output the signals to the first transmission path, i.e., the wireless link, or to the second transmission path, e.g., a wired or wireless link. The predetermined criteria may be, for example, that the BER is below a threshold level or, alternatively, that the S/N is above the threshold level. If the measure of spectral interference meets the predetermined criteria, e.g., the BER is below the threshold level or the S/N is above the threshold level, then the network entity may output the signals to the wireless link. Alternatively, if the measure of spectral interference does not meet the predetermined criteria, e.g., BER is equal to or above the threshold level or the S/N is equal to or below the threshold level, then the network entity will not output the signals to the wireless link. Instead, the network entity may output the signals to the second transmission path.

The network entity may measure the spectral interference for the wireless link. And the network entity may use the measure of spectral interference to determine whether to output the signals over the first transmission path, i.e., the wireless link, or over the second transmission path, e.g., a wired link or another wireless link. Alternatively, instead of the network entity measuring the spectral interference for the wireless link, the network entity may receive a message from another entity. The other entity may be communicatively coupled to the network entity. The message, itself, may indicate or allow the network entity to determine whether the signals should be output to the wireless link. For example, the message may indicate that the measure of spectral interference for the wireless link meets the predetermined criteria. As a result, the network entity may output the signals to the wireless link. Alternatively, the message may indicate that the measure of spectral interference does not meet the predetermined criteria. As a result, the network entity will not output the signals to the wireless link, and instead, will output the signals to the wired link or to the other wireless link.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
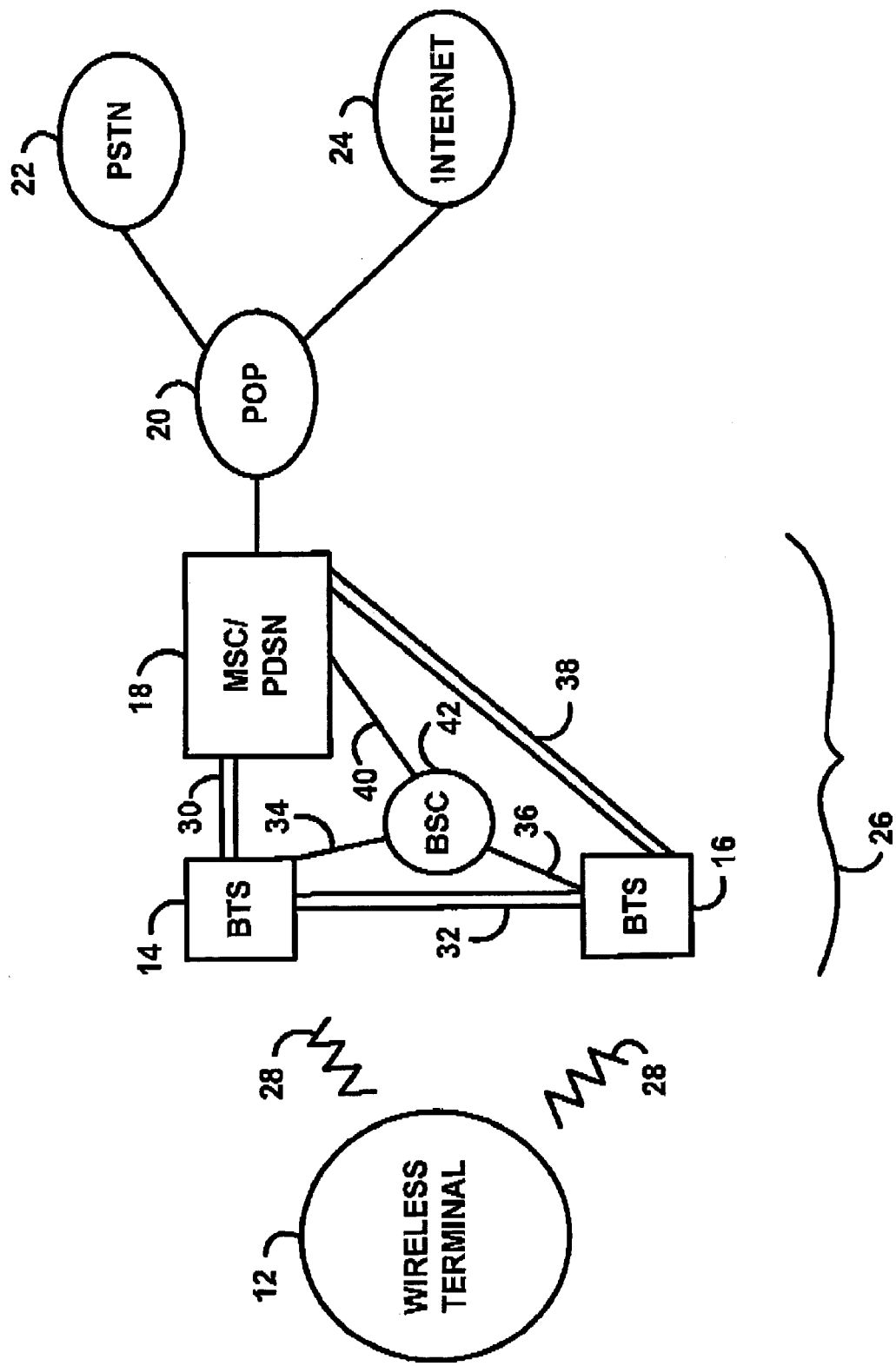
FIG. 1 is a block diagram of a wireless network architecture in which exemplary embodiments of the present invention may be employed.

FIG. 1 is a block diagram of a wireless network architecture in which exemplary embodiments of the present invention may be employed. Those skilled in the art will appreciate that other architectures can be used instead, additional elements may be added to these architectures, and some elements may be omitted altogether. Further, as in most telecommunications applications, those skilled in the art will appreciate that many of the elements described herein are functional entities that may be implemented as discrete components or in conjunction with other components, in any suitable combination and location. Moreover, the various functions described herein as being performed by one or more entities may be carried out by hardware or by a processor programmed to execute an appropriate set of computer instructions stored in memory. Provided with the present disclosure, those skilled in the art can readily design the hardware or prepare the appropriate set of computer instructions (e.g., software) to perform such functions.

Referring to FIG. 1, the wireless network architecture may include wireless terminal 12 that is communicatively coupled to a radio access network 26. The wireless terminal 12 may be, for example, a cellular telephone or a computer with a wireless modem. The radio access network 26 may be a plurality of network entities. The plurality of network entities may facilitate exchange of signals between the wireless terminal 12 and a PSTN 22 or the Internet 24.

The radio access network 26 may take a variety of forms. By way of example, the radio access network 26 may have BTS 14, 16 which exchange signals with the wireless terminal 12 over an air interface 28. Additionally, each BTS 14, 16 and an MSC or a PDSN (collectively referenced in FIG. 1 as MSC/PDSN 18) may send and receive signals between each other, through transmission paths 30, 38. Still additionally, BTS 14 and BTS 16 may send and receive signals between each other through transmission path 32.

The BTS 14, 16 may also be coupled to a BSC 42. Transmission paths 34, 36 may couple the BTS 14, 16 to the BSC 42. The BSC 42 may aggregate the signals from a plurality of BTSs and transmit the signals to the MSC/PDSN 18. Transmission path 40 may couple the BSC 42 to the MSC/PDSN 18. Additionally, MSC/PDSN 18 may use transmission path 40, in addition to transmission paths 30, 38, to transmit signals to the BTS 14, 16. The MSC/PDSN 18 may transmit the signals to the BTS 14, 16 by way of the BSC 42 and transmission paths 34, 36, 40.

A point of presence (POP) 20 may couple the MSC/PDSN 18 to the PSTN 22 or the Internet 24. The POP 20 may exchange signals between the MSC/PDSN 18 and the PSTN 22 or between the MSC/PDSN 18 and the Internet 24. The POP 20 may be coupled to the MSC/PDSN 18, the PSTN 22, and the Internet 24 by DS3 circuits, but of course other arrangements are also possible.

The transmission paths 30, 32, 38 may take a variety of forms. By way of example, the transmission paths 30, 32, 38 may be uni-directional or bi-directional wireless links. The transmission paths 30, 32, 38 allow for signals to be exchanged between the BTS 14, 16 and the MSC/PDSN 18.

The transmission paths 34, 36, 40 may be wired links. Transmission paths 34, 36 may be DS1 circuits and transmission path 40 may be a DS3 circuit. Other arrangements are also possible. For example, one or more of the transmission paths 34, 36, 40 may be wireless links.

Each of the wireless links in the radio access network 26 may be assigned a range of transmit frequencies and a range of receive frequencies. As a result, endpoints of the wireless links, e.g., BTSs and MSCs, may use the range of transmit frequencies and the range of receive frequencies to exchange signals through the radio access network 26.

The range of transmit frequencies and the range of receive frequencies may define a licensed spectrum. Typically, the transmit frequencies and the receive frequencies for each of the wireless links are coordinated so as to avoid interference with existing users in a same geographical area. Examples of licensed spectrum include the local multipoint distribution (LMDS) frequencies in the 28-31 GHz band and microwave multi-point distribution system (MMDS) frequencies at 2.5 GHz.

Alternatively, one or more of the wireless links may use transmit frequencies and receive frequencies that are unlicensed. The transmit frequencies and the receive frequencies that are unlicensed may be a range of frequencies which any device, conforming to standards set by a governmental agency, for instance, can operate. An example of an unlicensed spectrum includes a universal national information infrastructure (UNII) band wireless link. The UNII is a group of three 100 MHz bands in the 5 GHz range.

Figure 2:
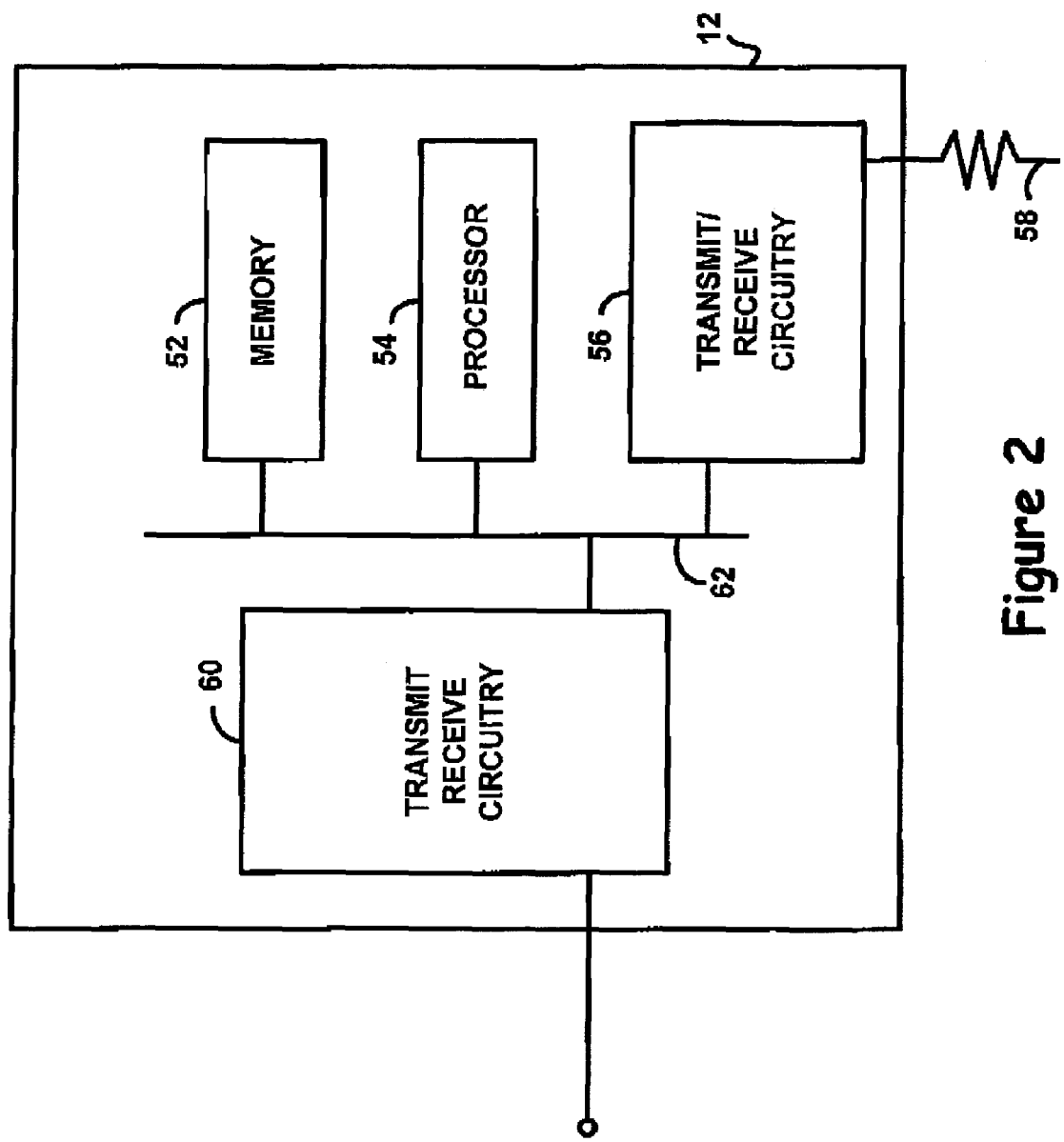
FIG. 2 depicts a network entity capable of transmitting and receiving signals through two or more transmission paths.

FIG. 2 depicts a network entity 50 in which exemplary embodiments of the present invention may be employed. The network entity 50 may be, for example, the base station 14, 16 or the MSC/PDSN 18. The network entity 50 may have a memory 52, a processor 54, and transmit/receive circuitry 56, 60 coupled to a bus 62. The transmit/receive circuitry 56, 60 may allow for exchange of signals over a wired or wireless link.

To exchange signals over the wireless link, the transmit/receive circuitry 56 may be coupled to an antenna 58. The antenna 58 may facilitate transmission and reception of signals over a wireless link. The antenna 58 may be physically separate from the transmit/receive circuitry 56, 60. Alternatively, the antenna 58 may be integrated into the transmit/receive circuitry 56. Similarly, the transmit/receive circuitry 56, 60 may be combined into a single circuit rather than being two physically separate circuits. Other arrangements are also possible.

As already noted, the BTS 14, 16 may transmit signals to the MSC 18 through the transmission paths 30, 32, 34, 36, 38, 40. Likewise, the MSC/PDSN 18 may transmit signals to the BTS 14 or BTS 16 directly through transmission paths 30, 38 or by way of BTS 42 through transmission paths 34, 36, 40. As the BTS 14, 16 and the MSC/PDSN 18 are coupled to at least two transmission paths, the BTS 14, 16 and the MSC/PDSN 18 may be arranged to select a transmission path through which to transmit the signals. The transmission path that the BTS 14, 16 and the MSC/PDSN 18 selects to transmit the signals may depend on which BTS received the signals, to where the BTS or the MSC/PDSN has to transmit the signals, and whether the transmission path through which the BTS or the MSC/PDSN can transmit the signals is a wired link or a wireless link.

In accordance with an exemplary embodiment of the present invention, the network entity 50, e.g., BTS 14, 16 or MSC/PDSN 18, may use a measure of spectral interference for a wireless link to determine whether to output signals received by the network entity to a first transmission path, i.e., the wireless link, or to a second transmission path, i.e., a wired link or another wireless link. The network entity may output the signals received by the network entity through the wireless link if the measure of spectral interference for the wireless link meets predetermined criteria. Alternatively, the network entity may output the signals received by the network entity through the second transmission path if the measure of spectral interference for the wireless link does not meet the predetermined criteria.

A bit error rate (BER) or a signal-to-noise ratio (S/N) may characterize the spectral interference for the wireless link.

The BER may be defined by a number of bits in error in a signal that is received from the wireless link as compared to a total number of bits in the signal. For example, the network entity may store in memory 52 a predetermined pattern of bits. The network entity may receive, at the transmit/receive circuitry 56, a digital signal at predefined intervals of time while also receiving other digital signals (e.g., defining bearer data). Absent transmission error, the digital signal may be supposed to define the predetermined pattern of bits. The processor 54 of network entity, or some other entity, may be programmed to compare bits defined by the digital signal to the bits in the predetermined pattern stored in memory. A number of bits that do not match the predetermined pattern of bits (as compared to a total number of bits in the predetermined pattern of bits) may indicate the bit error rate (BER), and thus, the spectral interference, for the wireless link.

Alternatively, the BER may be determined by calculating and comparing CRC codes. The digital signals may be defined by packets. Each of the packets may include a set of bits. The set of bits may be a CRC code, appended by a transmitter of the digital signals, which defines a number of bits that is zero or a number of bits that is one in the packet. The processor 54 of the network entity may receive the packet and calculate another CRC code. A difference between the CRC code appended by the transmitter and as calculated by the processor 54 of the network entity (as compared to a total number of bits in the packet) may indicate the BER and thus, the spectral interference, for the wireless link.

On the other hand, the network entity may characterize the spectral interference for the wireless link in terms of the S/N. The network entity may compute a ratio between strength of the signals that are received through the wireless terminal to noise. A power meter and a spectral analyzer may be coupled to the network entity. The power meter may measure power of the signals within a range of frequencies and the spectral analyzer may measure presence of signals within the range of frequencies. The network entity may use the power meter to measure the power of the signals that are received. Additionally, the network entity may use the spectral analyzer to measure noise, e.g., background noise and other signals within the range of frequencies that defines the wireless link. The S/N (i.e., ratio of signal strength to noise) may characterize the spectral interference.

Of course, other arrangements are also possible for characterizing the spectral interference for the wireless link in accordance with the exemplary embodiments of the present invention. For example, the spectral interference may be characterized as an absolute number of bits in error rather than a number of bits in error as compared to a total number of bits. Or the spectral interference may be characterized as a ratio of the noise to the signal strength (i.e., N/S). Still other arrangements are also possible.

Figure 3:
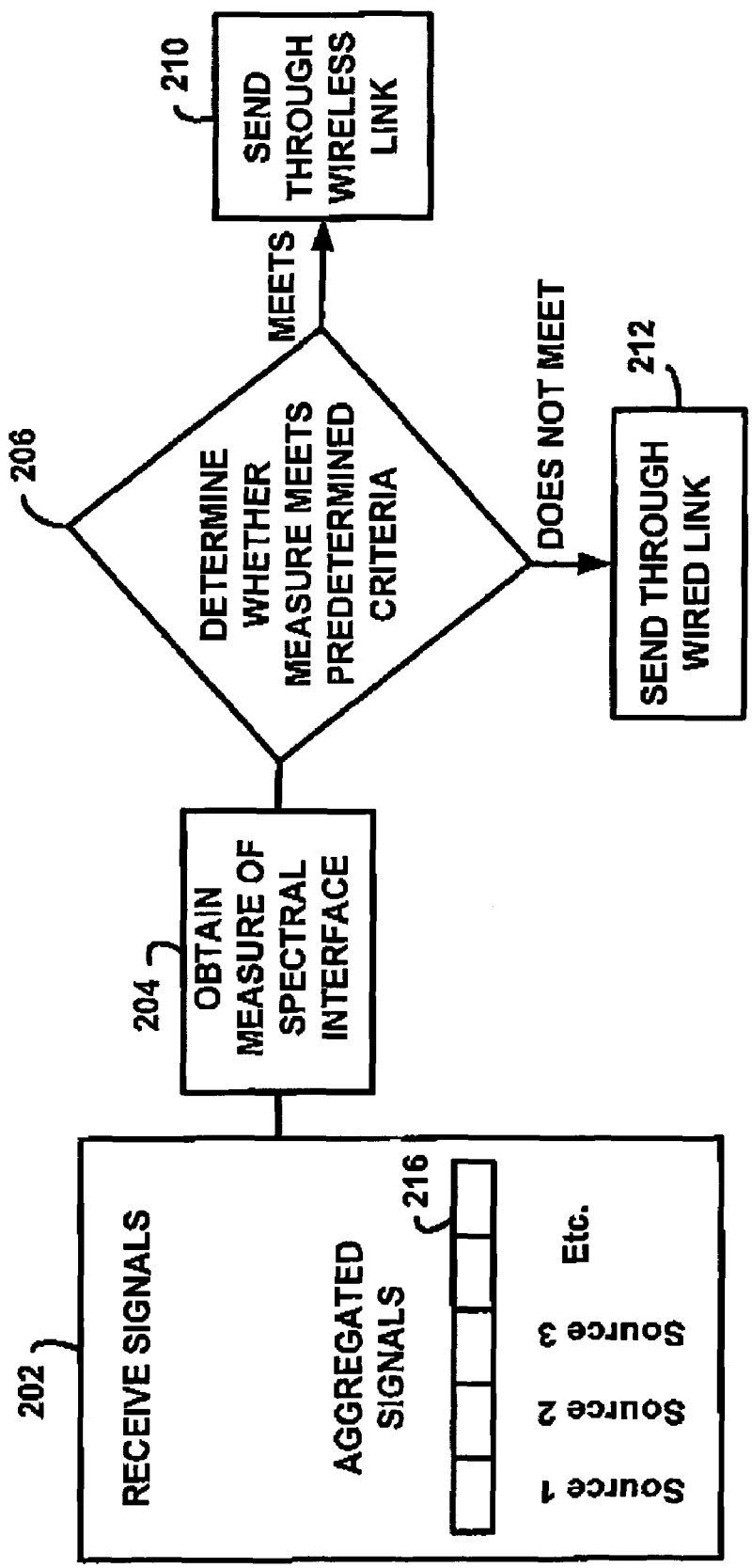
FIG. 3 is an exemplary flow chart illustrating how a measure of spectral interference for a wireless link can be used to select a transmission path through which the signals are transmitted.

FIG. 3 is a flow chart that illustrates how the network entity 50, e.g., BTS 14, 16 or MSC/PDSN 18 uses the measure of spectral interference to select one of two or more transmission paths (at least one of which is a wireless link) through which to output signals.

The method and system may begin at step 202, where the network entity 50 receives the signals at the transmit/receive switch 56, 60. The signals may be from source entities, e.g., wireless terminals 12, BTS 14, 16, MSC/PDSN 18, the Internet 24, or the PSTN 22. If the network entity receives the signals from two or more source entities, e.g., a plurality of wireless terminals, a plurality of base stations, or a plurality of MSC/PDSNs, then the network entity may optionally aggregate the signals. The network entity may aggregate the signals from the more than one source by multiplexing the signals in time, as shown by aggregated signals 216. Other arrangements are also possible.

At step 204, the network entity may obtain a measure of spectral interference for a wireless link. The wireless link may be one of the two or more transmission paths through which the network entity may transmit the signals. The network entity may transmit the signals through the one of the two or more transmission paths to another entity within the wireless network.

According to an exemplary embodiment of the present invention, the network entity may measure the spectral interference, e.g., BER or S/N, for the wireless link. Alternatively, the network entity may obtain the measure of spectral interference from another network entity in the wireless network. The other network entity may be coupled to the wireless link. The other network entity may measure the spectral interference for the wireless link and send, e.g., in a message, the measure of spectral interference to the network entity. Still alternatively, the network entity may obtain the measure of spectral interference from a database entity. The database entity may receive the measure of the spectral interference from an entity that is coupled to the wireless link and send the measure of spectral interference to the network entity. Other arrangements are also possible.

At step 206, the processor 54 of the network entity may be programmed to determine whether the measure of the spectral interference meets predetermined criteria. If the measure of spectral interference meets the predetermined criteria, then the processor 54 may cause the signals to be sent through a first transmission path, i.e., the wireless link, at step 210. If the measure of spectral interference does not meet the predetermined criteria, then the processor 54 may cause the signals to be sent through a second transmission path, e.g., a wired link or another wireless link, at step 212.

The predetermined criteria may be characterized in many ways. The way that the predetermined criteria is characterized may depend on what is the measure of spectral interference, e.g., a BER or a S/N. For instance, the BER has a characteristic that a higher value corresponds to a higher spectral interference. As a result, the predetermined criteria may be that the BER is below a threshold level programmed into the memory 52 of the network entity. If the BER is below the threshold level, then the measure of spectral interference meets the predetermined criteria and the signals may be sent over a wireless link. Alternatively, the S/N has a characteristic that a higher value corresponds to a lower spectral interference. As a result, the predetermined criteria may be that the S/N is above a threshold level programmed into the memory 52 of the network entity. If the S/N is above the threshold level, then the measure of spectral interference meets the predetermined criteria and the signals may be sent over the wireless link. Other arrangements are also possible as well.

Additionally, as already noted, the determination of whether the measure of spectral interference meets the predetermined criteria need not be performed by the network entity. For example, another entity may be communicatively coupled to the network entity. The other entity may determine the BER or the S/N for the wireless link and determine whether to send the signals through the wireless link. The other network entity may send a message to the network entity, which indicates whether the network entity should send the signals through the wireless link. The network entity may responsively send the signals through the wireless link or through the second transmission path.

Still additionally, the network entity may evaluate activity on the radio access network and/or consider time-of-day in determining whether to send signals over the wireless link.

According to one exemplary embodiment of the present invention, the network entity may use knowledge of a number of wireless terminals currently being served by an MSC/PDSN, in addition to a measure of spectral interference for the wireless link, to select the transmission path through which to transmit the signals. For example, the network entity may determine that the measure of spectral interference for the wireless link meets the predetermined criteria. Before sending the signals through the wireless link to the MSC/PDSN, however, the network entity may be programmed to additionally determine whether a number of wireless terminals served by MSC/PDSN 18 has reached a maximum capacity. The network entity may send a query to the MSC/PDSN 18 and the MSC/PDSN 18 may responsively send a message to the network entity. The message may indicate to the BTS 16 that the MSC/PDSN 18 cannot serve additional wireless terminals. As a result, the BTS 16 may send the signals from the wireless terminals 12 to another MSC/PDSN, instead of sending the signals from the wireless terminals 12 to the MSC/PDSN 18 through the wireless link. Alternatively, the message may indicate to the BTS 16 that the MSC/PDSN 18 can serve additional wireless terminals. As a result, the BTS 16 may send the signals from the wireless terminals 12 to the MSC/PDSN 18. Thus, the BTS 16 may use the number of wireless terminals currently being served by the MSC/PDSN, in addition to the measure of spectral interference for the wireless link, to determine whether to send the signals through the wireless link.

According to another exemplary embodiment of the present invention, the network entity may use known spectral interference levels for a transmission path at particular times of day to select the transmission path through which to transmit the signals. The base station 14 may account for the known levels of spectral interference by sending the signals through another transmission path during these particular times of day. For example, if a first transmission path has a high level of spectral interference between 4 and 5 pm, then, between 4 and 5 pm, the base station 14 may send the signals from the wireless terminal 12 through a second transmission path, instead of the first transmission path. Thus, the base station 14 may use the known spectral interference levels and the time of day to select the transmission path through which to send the signals.

According to yet another exemplary embodiment of the present invention, the network entity may also account for usage charges in determining the transmission path to carry the signals. The measure of spectral interference for the wireless link may indicate that the signals can be sent through the wireless link. Prior to sending the signals through the wireless link, the processor 54 may determine usage charges for the wireless link. The network entity may have a usage-based staircase billing model stored in memory 54. The processor 54 may be programmed to determine the usage charges of a transmission path. Under the usage-based staircase billing model, a given fee is charged until the traffic reaches a particular limit. Any additional traffic is charged more, in increments proportional to the capacity utilized beyond the limit. The network entity may be programmed to send the signals through the wireless link so as long as the usage charges is below a predefined usage level, which is programmed the memory. Other arrangements are also possible.

Figure 4:
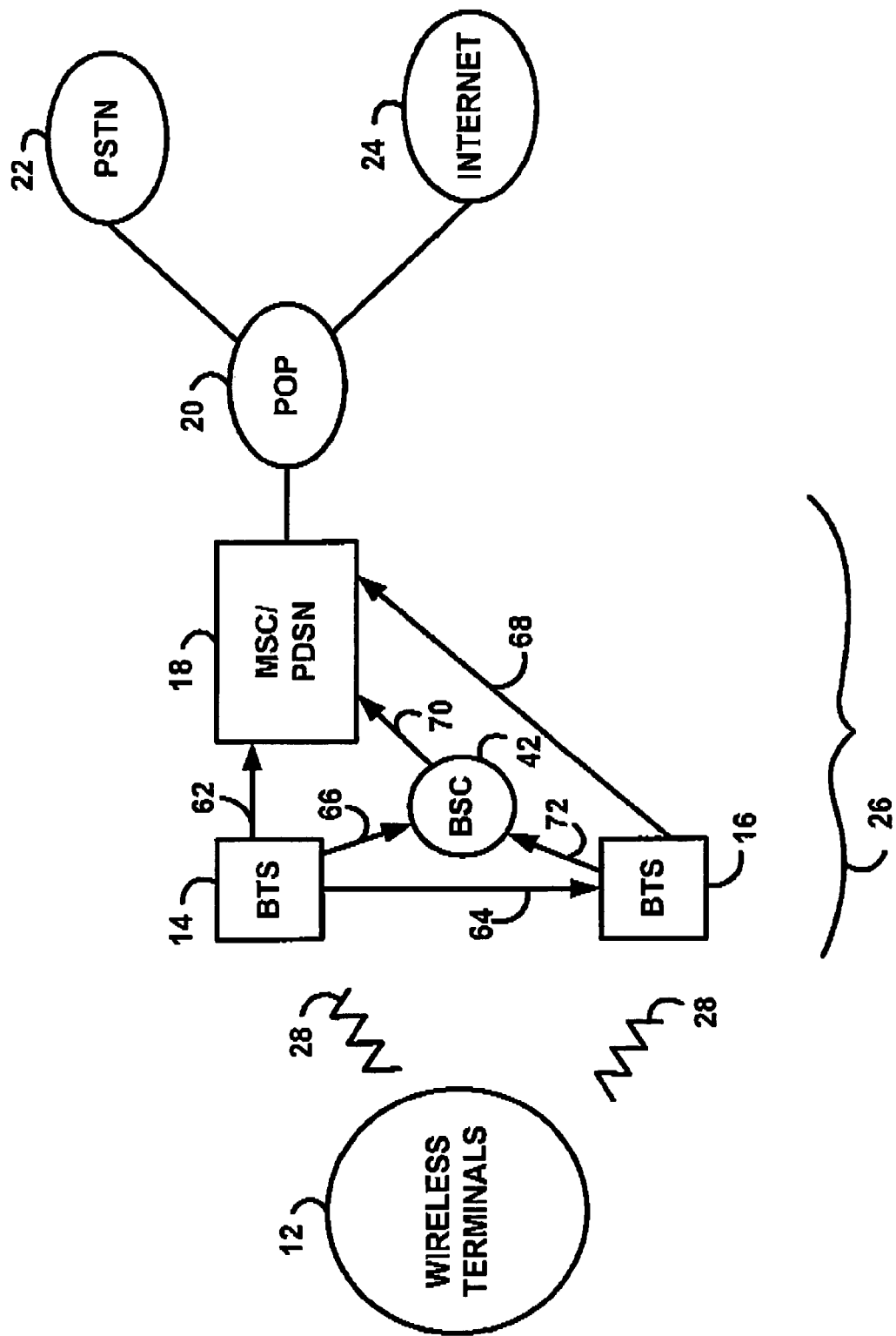
FIG. 4 illustrates how the measure of spectral interference is used to route the signals through the wireless network.

FIG. 4 illustrates use of the measure of spectral interference by a network entity to determine a path of the signals through the radio access network 26. Transmission paths 62, 64, 66, 68, 70, and 72 are exemplary transmission paths that signals may take through the radio access network 26. The transmission paths 62, 64 66, 68, 70, and 72 may be wired or wireless links. For example, transmission path 62, 64, and 68 may be wireless links and transmission paths 66, 70, 72 may be wired links. The transmission paths 62, 64, 66, 68, 70, 72 illustrate a single direction (indicated by an arrow) by which the signals may be carried between the BTS 14, 16 and the MSC/PDSN 18, but other arrangements are also possible.

In accordance with exemplary embodiments of the present invention, a network entity, e.g., BTS 14, 16 and MSC/PDSN 18 may use the measure of spectral interference to determine whether to output the signals to a first transmission path, i.e., a wireless link, or to a second transmission path, e.g., a wired link or another wireless link. For example, BTS 14 may receive signals from the wireless terminal 12 that are to be transmitted through the radio access network 26 and to the MSC/PDSN 18. If the measure of spectral interference for the transmission path 62 (e.g., a wireless link) meets the predetermined criteria, e.g., the BER is below the threshold level or the S/N is above the threshold level, then the BTS 14 may transmit the signals directly to the MSC/PDSN 18 through the transmission path 62. The MSC/PDSN 18 may then forward the signals to the POP 20 and to the PSTN 22 or to the Internet 24.

If the measure of the spectral interference for transmission path 62 does not meet the predetermined criteria, e.g., the BER is equal to or above the threshold level or the S/N is equal to or below the threshold level, then the BTS 14 may transmit the signals to the BSC 42 through the transmission path 66 (e.g., a wired link). And BSC 42 may forward the signals to the MSC/PDSN 18 through transmission path 70. Because the measure of the spectral interference does not meet the predetermined criteria, the wired link may more reliably communicate the signals as compared to the wireless link.

Alternatively, if the measure of the spectral interference for transmission path 62 does not meet the predetermined criteria, then the BTS 14 may transmit the signals to the BTS 16 through the transmission path 64. Then, the BTS 16 may route the signals to the MSC/PDSN 18. The BTS 16 may be capable of transmitting the signals through the transmission paths 68, 72, at least one of which is a wireless link. Like BTS 14, the BTS 16 may output the signals to MSC/PDSN 18 through the transmission path 68 (e.g., a wireless link) if the measure of spectral interference for the transmission path 68 meets the predetermined criteria. Alternatively, the BTS 16 may output the signals to MSC/PDSN 40 through the transmission path 72 (e.g., a wired link) if the measure of spectral interference does not meet the predetermined criteria. And the BSC 42 may forward the signals to the MSC/PDSN 18.

The measure of spectral interference allows for determining the transmission path over which to transmit the signals so as to achieve increased reliability of transmission and reception of the signals within the radio access network 26. As already noted, the transmission paths illustrated by FIG. 4 are exemplary in nature. The signals may take transmission paths other than those described through the exemplary radio access network. Also, the radio access network 26 may have transmission paths in addition to or, instead of, those illustrated.

Exemplary embodiments have thus been illustrated and described. It will be understood, however, that changes and modifications may be made to the invention as described without deviating from the spirit and scope of the invention, as defined by the following claims.

I claim:

1. In a first network entity of a type that (i) receives signals from at least one source network entity and (ii) outputs the signals through one of two or more transmission paths, the two or more transmission paths including a wireless link, a method comprising:

obtaining, at the first network entity, a measure of spectral interference for the wireless link between the first network entity and a second network entity, wherein the first network entity receives the signals from the at least one source network entity, and wherein each of the first and second network entities is selected from the group consisting of a base station, a mobile switching center, and a packet data serving node that serves mobile stations and provides connectivity between a base station and an Internet;

making a determination of whether the measure of spectral interference for the wireless link meets predetermined criteria;

if the determination is that the measure of spectral interference for the wireless link meets the predetermined criteria, then outputting the signals to the wireless link; and if the determination is that the measure of spectral interference for the wireless link does not meet the predetermined criteria, then outputting the signals to another transmission path of the two or more transmission paths.

2. The method of claim 1, wherein the at least one source network entity is a wireless terminal.

3. The method of claim 1, wherein the first network entity is separated from the at least one source network entity by an air interface.

4. The method of claim 1, wherein the other transmission path of the two or more transmission paths is a wired link.

5. The method of claim 1, wherein obtaining the measure of spectral interference for the wireless link comprises receiving from another network entity a message, the message defining the measure of spectral interference for the wireless link.

6. The method of claim 1, wherein the measure of spectral interference is selected from the group consisting of a bit error rate and a signal-to-noise ratio.

7. The method of claim 1, wherein the at least one source network entity is two or more source network entities, the method further comprising aggregating the signals from the two or more source network entities prior to the signals being outputted.

8. The method of claim 1, wherein the measure of spectral interference is a signal-to-noise ratio; and making the determination of whether the measure of spectral interference for the wireless link meets the predetermined criteria comprises determining whether the signal-to-noise ratio is above a threshold level.

9. The method of claim 1, wherein the measure of spectral interference is a bit error rate; and making the determination of whether the measure of spectral interference for the wireless link meets the predetermined criteria comprises determining whether the measure of spectral interference for the wireless link is below a threshold level.

10. The method of claim 1, wherein obtaining the measure of spectral interference for the wireless link at the first network entity comprises measuring the spectral interference for the wireless link.

11. A first network entity of a type that (i) receives signals from at least one source network entity; and (ii) that outputs the signals through one of two or more transmission paths, the two or more transmission paths including a wireless link, the first network entity comprising computer instructions stored in memory and executable by a processor for performing the following functions:

obtaining, at the first network entity, a measure of spectral interference for the wireless link between the first network entity and a second network entity, wherein the first network entity receives signals from the at least one source network entity, and wherein each of the first and second network entities is selected from the group consisting of a base station, a mobile switching center, and a packet data serving node that serves mobile stations and provides connectivity between a base station and an Internet;

making a determination of whether the measure of spectral interference for the wireless link meets predetermined criteria;

if the determination is that the measure of spectral interference for the wireless link meets the predetermined criteria, then outputting at the first network entity the signals sent from a wireless terminal to the wireless link; and if the determination is that the measure of spectral interference for the wireless link does not meet the predetermined criteria, then outputting at the first network entity the signals received from the wireless terminal to another transmission path of the two or more transmission paths.

12. The first network entity of claim 11, wherein the at least one source network entity is a wireless terminal.

13. The first network entity of claim 11, wherein the at least one source entity is separated from the first network entity by an air interface.

14. The first network entity of claim 11, wherein the other transmission path of the two or more transmission paths is a wired link.

15. The first network entity of claim 11, wherein the computer instructions executable by the processor for obtaining the measure of spectral interference for the wireless link at the first network entity comprise computer instructions executable by the processor for performing the function of measuring the spectral interference for the wireless link.

16. The first network entity of claim 11, wherein the computer instructions executable by the processor for obtaining the measure of spectral interference for the wireless link comprise computer instructions executable by the processor for performing the function of receiving the measure of spectral interference from another network entity communicatively coupled to the first network entity.

17. The first network entity of claim 11, wherein the at least one source network entity is two or more source entities, the first network entity further comprising computer instructions executable by the processor for performing the function of aggregating the signals from the two or more source network entities prior to the signals being outputted.

18. The first network entity of claim 11, wherein the measure of spectral interference is a signal-to-noise ratio; and the computer instructions executable by the processor for making the determination of whether the measure of spectral interference for the wireless link meets the predetermined criteria comprise computer instructions stored in the memory and executable by the processor for determining whether the signal-to-noise ratio for the wireless link is above a threshold level.

19. The first network entity of claim 11, wherein the measure of spectral interference is a bit error rate; and the computer instructions executable by the processor for making the determination of whether the measure of spectral interference for the wireless link meets the predetermined criteria comprise computer instructions stored in memory and executable by the processor for determining whether the bit error rate for the wireless link is below a threshold level.

* * * * *